US00RE44363E

(19) United States
(12) Reissued Patent
Kavak

(10) Patent Number: US RE44,363 E
(45) Date of Reissued Patent: Jul. 9, 2013

(54) ARRANGEMENT FOR LOAD SHARING IN COMPUTER NETWORKS

(75) Inventor: Nail Kavak, Sunnyvale, CA (US)

(73) Assignee: Intellectual Ventures I LLC, Wilmington, DE (US)

(21) Appl. No.: 11/347,783

(22) Filed: Feb. 3, 2006 (Under 37 CFR 1.47)

Related U.S. Patent Documents

Reissue of:
(64) Patent No.: 6,687,731
Issued: Feb. 3, 2004
Appl. No.: 09/424,872
PCT Filed: Jun. 8, 1998
PCT No.: PCT/SE98/01085
§ 371 (c)(1),
(2), (4) Date: Feb. 7, 2000
PCT Pub. No.: WO98/57275
PCT Pub. Date: Dec. 17, 1998

(51) Int. Cl.
*G06F 15/173* (2006.01)

(52) U.S. Cl.
USPC ..... 709/226; 718/104; 718/105; 709/203; 709/223; 709/238; 370/351

(58) Field of Classification Search
USPC .. 709/203, 219, 226, 238, 242, 223; 718/104, 718/105; 370/351, 389
See application file for complete search history.

(56) References Cited

U.S. PATENT DOCUMENTS

| | | | | |
|---|---|---|---|---|
| 4,933,936 | A | 6/1990 | Rasmussen et al. | |
| 5,031,089 | A | 7/1991 | Liu et al. | |
| 5,283,897 | A | 2/1994 | Georgiadis et al. | |
| 5,539,883 | A | 7/1996 | Allon et al. | |
| 5,774,660 | A * | 6/1998 | Brendel et al. | 709/201 |
| 5,881,238 | A * | 3/1999 | Aman et al. | 709/226 |
| 6,052,718 | A * | 4/2000 | Gifford | 709/219 |
| 6,061,349 | A | 5/2000 | Coile et al. | |
| 6,154,744 | A | 11/2000 | Kenner et al. | |
| 6,167,438 | A | 12/2000 | Yates et al. | |
| 6,185,619 | B1 | 2/2001 | Joffe et al. | |
| 6,185,691 | B1 | 2/2001 | Joffe et al. | |
| 6,189,043 | B1 | 2/2001 | Buyukkoc et al. | |
| 6,343,313 | B1 | 1/2002 | Salesky et al. | |

FOREIGN PATENT DOCUMENTS

| | | |
|---|---|---|
| EP | 0 479 660 | 4/1992 |
| EP | 0 742 658 | 11/1996 |
| JP | 8-271863 | 9/1996 |

OTHER PUBLICATIONS

The ATM Forum, Technical Committee, LAN Emulation Over ATM, Version 1.0, Jan. 1995, 139 pages.
International Search Report on International application No. PCT/SE98/01085 dated Dec. 17, 1998; 4 pages.

(Continued)

*Primary Examiner* — Frantz B Jean

(57) ABSTRACT

The invention relates to an arrangement for load sharing in computer networks and, more exactly, an arrangement for distribution of traffic, for instance via Internet, from clients (1) to service suppliers who provide services from many servers. The invention makes possible distribution to one of a number of replicated servers. Suitable server is selected for instance on basis of available resources at the interface of the server, or less delay in the transmission. The invention results in better performance and reduced traffic by distribution of the traffic geographically and from a resource point of view. According to the invention, a number of replicated servers (5A-5E) belong to an anycast-group and each anycast-group is connected to a domain name server (2) which has the ability to select one of the replicated servers, so that a router (4) can establish a connection between the selected server and the service-requesting client computer. Each replicated server (5A-5E) can transmit a resource advertisement which contains information about available resources at the server in question, and about the link parameters of the server.

40 Claims, 2 Drawing Sheets

OTHER PUBLICATIONS

International Preliminary Examination Report on International application No. PCT/SE98/01085 dated Oct. 26, 1999; 4 pages.

The ATM Forum Technical Committee LAN Emulation Over ATM, version 1.0, Jan. 1995.*

* cited by examiner

<table>
<tr><td>LS Age</td><td>Options</td><td>16</td></tr>
<tr><td colspan="3">Link state16</td></tr>
<tr><td colspan="3">Advertising router</td></tr>
<tr><td colspan="3">Link sequence number</td></tr>
<tr><td colspan="2">LS check sum</td><td>Length</td></tr>
<tr><td>rtype</td><td>0</td><td>number of links</td></tr>
<tr><td colspan="3">Link ID</td></tr>
<tr><td colspan="3">Link Data</td></tr>
<tr><td>Link type</td><td>0</td><td>TOS 0 Metric</td></tr>
<tr><td colspan="3">Link Delay</td></tr>
<tr><td colspan="3">Available resource: Token Bucket Depth</td></tr>
<tr><td colspan="3">Available resource: Token Bucket Rate</td></tr>
</table>

Figure 2

ARRANGEMENT FOR LOAD SHARING IN COMPUTER NETWORKS

Matter enclosed in heavy brackets [ ] appears in the original patent but forms no part of this reissue specification; matter printed in italics indicates the additions made by reissue.

*This application is a reissue application of U.S. application Ser. No. 09/424,872 (U.S. Pat. No. 6,687,731), which is a National Stage Entry of PCT/SE98/01085, filed on Jun. 8, 1998, which claims foreign priority to SE 9702239, filed Jun. 12, 1997, each of which is incorporated by reference in its entirety.*

BACKGROUND OF THE INVENTION

1. Field of the Invention

The present invention relates to an arrangement for load sharing in computer networks, and more exactly, an arrangement for distribution of traffic, for instance via Internet, from clients to the service suppliers who provide services from a multiple of servers. The invention makes possible distribution to a number of replicated servers. Suitable server is selected, for instance, on basis or available resources at the server's interface or on less delay in the connection. The invention results in better performance and reduced traffic by distribution of the traffic geographically and from a resource point of view.

2. Discussion of the Background

Many internationally big companies provide a multiple of copies of their information servers, in some cases also abroad, with the aim to increase accessability and performance for the Internet user. One problem is that some servers always are more loaded than others, especially because audio- and video file transmissions in real time are becoming more and more popular. This results in congestions in the networks.

A conventional way of solving this problem is to replace an existing server by another which has higher process capacity and storage capacity. In most cases, however, the problem is not lack of capacity but lack of load sharing, i.e. the solution often is to utilize the existing network resources better.

In some cases the information is copied or replicated in a multiple of servers which are distributed geographically in different places in order to improve response times. Traditionally, the traffic is distributed on the different servers by using a sequential (round robin) or random technology. In this sequential technology the servers are selected sequentially in turn, whereas random technology selects servers in just any order. In none of these technologies information about the load on the servers, or of the localization of the servers in the network, is utilized.

The present invention solves the above mentioned problems by utilizing information about the load and the network topology of the servers, together with a technology to to address suitable servers, namely the anycast-technology (anycast routing and anycast addressing). By that, the invention can distribute traffic to geographically distributed servers so that the traffic is distributed to for instance less loaded server.

SUMMARY OF THE INVENTION

Consequently the present invention provides an arrangement for load sharing in a computer network, comprising a larger number of users or clients with computers, at least one service supplier which provides services via a number of replicated servers, a computer network with routers which can connect the client computers with the servers in order to connect a client computer which requests a service with suitable server.

According to the invention a number of replicated servers belong to a common address group (anycast-group) and each anycast-group is connected to a domain name server which has the ability to select one of the replicated servers, so that a router can establish a connection between the selected server and the service-requesting client computer.

Preferably the domain name server is arranged to select the least loaded replicated server or the nearest replicated server. Each replicated server can transmit a resource message which contains information about available resources at the server in question, and about the link parameters of the server.

Thanks to the new technology according to the present invention, a number of advantages are achieved. The end users make benefit from the lower delay and higher performance. The number of servers in the network or with the service supplier can be reduced. It will be easy to add or subtract servers without the users becoming interfered with, i.e. without interrupting services in progress. This implies considerably reduced investment costs and managing costs for the network operator and the service supplier, while the end laser at the same time is offered higher performance. The end users are not aware of that there are several servers which provide the same service.

The invention provides cost efficient solutions which can be configured automatically and are transparent to the user. The invention makes possible step by step expansion of servers and adapts the capacity according to the need. By routing traffic to the least loaded server, the number of jumps and potential time delays are reduced.

BRIEF DESCRIPTION OF THE DRAWINGS

A preferred embodiment of the invention will be described in detail below with reference to enclosed drawings where:

FIG. 2 is an illustration over the format of a resource message according to the invention.

DETAILED DESCRIPTION OF THE PREFERRED EMBODIMENTS

Figure 1:
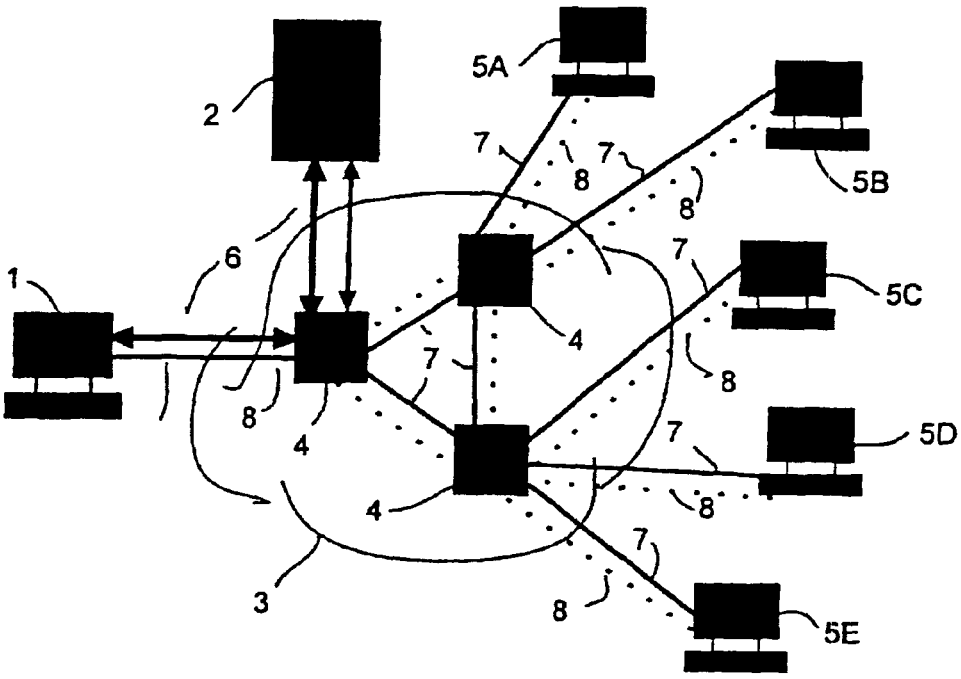
FIG. 1 is a diagram over the arrangement according to the invention.

One of the more important limited resources for instance in World Wide Web is network bandwidth and processor capacity of servers and client computers. The network bandwidth and the processor power are increasing from a general point of view, but not fast enough to keep pace with the more and more increasing number of users in the network. The number of users soon will be a billion.

This would be no problem if the users restricted their activities to their local machines, but the network makes possible for the users to request documents from servers in distant located places. It is also a fact that some servers are more popular than others, which means that these servers have to carry a too heavy load in spite of that there are a lot of servers which can deliver the same services. A solution to this problem is to store documents nearer the users. This will reduce both the network traffic and the load of the servers. A similar solution is a replication or copying which essentially implies buffer storing before the documents are requested. The cost of multireplication can be reduced by using flow transmission distribution as is supported by NNTP (Network News Transfer Protocol). Further, replication can be applied both at services and documents. If replicated servers are in clusters near the original server, this will reduce the load on the single server, but does not reduce the network traffic because all requests are still going to the cluster. If, however, replicated servers are distributed over the network, and if clients automatically can locate the nearest or least loaded server, this would reduce the network traffic as well.

The aim of the present invention is to provide an arrangement by which the network resources can be used more efficiently. The aim is to dynamically route the user traffic to a least loaded application server. The advantages which at that are achieved, are mentioned above. Even if the invention is described with special reference to IP over ATM (i.e. networks which operate with Internet-protocol with Asynchronous Transfer Mode), the invention can as well be applied to other technologies than ATM.

In FIG. 1 is shown a diagram over a preferred arrangement according to the invention. A client computer 1 has a virtual circuit connection established to its domain name servers (DNS) 2, of which one is shown in the figure, via the network 3. There may be a secondary connection to a reserve domain name server (not shown) which can be accessed at error or at break/interruption. In the network there are a number of routers 4, which establish connections with servers 5A to 5E as service suppliers. All the servers 5A, 5B, 5C, 5D, 5E are copies of each other and constitute the same anycast-group or "common address group". Anycast-groups only transmit a virtual IP-address to their neighbours. A logical address can correspond to a number of physical addresses.

The domain name server has knowledge of all anycast-groups. For scaling and performance reasons anycast-groups can be distributed over many domain name servers. The anycast-group members are connected to the domain name servers by a point-to-multipoint-connection.

The function of the arrangement can be summarized as follows. The client computer first transmits a request to a domain name server to resolve a domain name into an IP-address. Control messages to and from the domain name server are represented by the bold arrows 6 in the figure. The domain name server first controls the semantics of the DNS-request in order to find out which application that was requested. For instance, an ftp-request is handled in a different way than a ping-request. The former is long-lived, whereas the latter is short-lived. The type of application assists the domain name server in selecting the most relevant server for each request. In some cases the least loaded server is selected, whereas in other cases the cheapest link and belonging server is selected.

In an IPATM-network a transmitter sometimes prefers to use the shortest route for time critical applications, for instance pictures, video, ftp, and in other cases the same transmitter would prefer the cheapest route, such as ping, dns etc.

The domain name server receives continuously routing information from all anycast-servers which it is serving. The routing information is transmitted via the connections marked 7 in the FIG. 1. The routing information includes details about the available capacity for each link, the number of jumps to each server, the bandwidth of each link, the processor capacity, measured delay etc. The domain name server returns the IP-address to the server which is best adapted to the application demands which are derived from the DNS-request. When the IP-address has been resolved, it is returned to the client computer so that a direct connection is established between the client computer and the server. The connection is transparent to the domain name server. The server or document which is requested, then can be transferred to the client computer. The data flow is shown at 8 in FIG. 1.

To select one server out of the different suitable, exactly alike servers, anycast-technology is used. An anycast-address (common address) is used to represent a group of nodes, one of which shall be selected. When an anycast-address is received, the domain name server delivers the IP-address to all destinations which are represented by the anycast-address. Since many servers can have the same anycast-address, the router conventionally selects one of them by collecting information about the number of jumps to the different servers and selects the nearest one. Use of links is another at present available criterion. Other possible criteria are costs, processor load, storage, routing policy etc.

One important aspect of the invention is to use the anycast-technology to access services which are delivered by a larger number of servers which are operating on different network nodes. Especially the same service can be accessed by one single anycast-address irrespective of how many servers that are used for the service and of where the servers are located in the network. To copy the service at many servers over the network is useful when high service accessibility is required. Other services which might benefit from anycast-technolgy include: World Wide Web, video services, domain name servers, address resolving servers, Neighbour Discovery-servers, 020-number services, telephoning via Internet, and the Public Switched Telephone Network in order to find the most cost efficient voice services etc.

An anycast-server, ANS, which can be located together with the domain name server 2, holds information about the membership for all anycast-service members 5A-5E. A node can register itself at the anycast-service, join as a member, withdraw from and stop participating in the ANS-service.

To make load sharing distribution to least loaded servers, each server needs to inform the surroundings about its accessible resources. To this purpose a Resource Advertisement (RA) is transmitted. At calculation of service quality routes (QoS routes), RA is used.

Each server produces a resource advertisement for each coverage area and indicates the largest amount of accessible resources for reservations on the interface of each of the servers in the coverage area, together with the delay parameters of the link. These parameters are roughly analogous to the standard cost value "Open Shortest Path First" (OSPF), but are independent of the standard service type value to better characterize the static delay characteristics of a link. A new copy of the resource message is produced whenever a new routing resource advertisement is produced for the coverage area, or whenever the available bandwidth resource or the delay is changed for a link in the coverage area. An algorithm can be used so that a new resource advertisement is produced only when the available bandwith resource is changed to a considerable extent. Resource advertisements are transmitted in flows through one single coverage area. The format of the resource advertisement is shown i FIG. 2.

The number of links is the link number which is included in the resource advertisement. For each link, the link type, link identity, and link data, are the same as for the routing resource advertisement. The available link resource is represented by packet data area parameters in floating point format with simple precision according to IEEE, as in the service model Control Load. The link delay is a statistical delay value for the link expressed in milliseconds.

Input to the routing calculation includes source address and destination address and the service qualities for the flow, which at present are the packet data area parameters from the Path-message of the resource reservation protocol, but might also be derived from other trigger units. In order to calculate the best route, or the route with least delay, the statistical delay value is used in the same way as OSPF uses the zero cost value of the TOS (Type of Service) of the router.

The DNS-server need both information about available resources and existing resource reservation in additon to the normal information about topology and membership.

When a new replicated server connects to an anycast-group, the local router informs about the existence of the service as a part of its normal routing exchanges with the neighbouring routers. If the local router observes that a replicated server has stopped transmitting messages, also this negative information is transmitted to the neighbouring routers. Each of the neighbouring routers studies a distance value for the announced anycast-server, updates its tables based on this value, and forwards in its turn the updated information to its neighbours. Each router maintains knowledge at least of the route to the nearest anycast-servers and possibly a small list over alternative servers in case it is informed that the previous nearest server is down. In this way every router in the network will have the sufficient knowledge to route anycast-packets to the nearest server, but need not maintain a database over all anycast-servers in the network. If a client transmits a request for connection to the anycast-group, and if it is not a service in the local subnetwork, the local router forwards the packet to the nearest replicated server based on the current routing tables.

It is assumed that an anycast-call can be routed to one of the servers on a normal level in the server hierarchy, irrespective of where these servers are physically located in the network. For may applications the normal level would be either the level for the anycast-caller's node, or nearest level above. The anycast-caller shall not need to know any details about how the service hierarchy is organized, or even how the levels in the server hierarchy are numbered. All that the caller need to specify is that an anycast-call should be routed to a server on the lowest possible higher level where a server can be found. To meet the demands and address a server hierarchy by one single address, the invention suggests to widen the definition of proximity which is used by routing algorithms to include new parameters to measure proximity. Suppose that PNNI-routing levels (Private Network Node Interface) are used to identify the hierarchical levels of the servers. If we let the difference between two routing level identifiers be an acceptable measure of proximity between two corresponding nodes, an anycast-caller need not directly specify a level in the hierarchy. By use of this measurement parameter routing to servers on the lowest possible higher level in a hierarchy of servers can be supported, irrespective of the physical distance between the requested server and the client.

Consequently the present invention provides an arrangement for load sharing which solves the indicated problems. An expert in the field realizes that the invention can be implemented in a number of different ways with different combinations of hardware and software without leaving the frame of the invention. The extent of protection of the invention is only limited by the patent claims below.

What is claimed is:

1. A computer implemented system for designating a resource location among a plurality of resource locations, comprising:

at least one client computer;

at least one service supplier responsive to requests of the at least one client computer, the at least one service supplier comprising, i. a domain server configured to provide access to the plurality of resource locations in response to a request from the at least one client computer, the plurality of resource locations being replicated servers operably linked to the domain server, a portion of the replicated servers being configured to be responsive to an anycast address protocol, ii. at least one router responsive to the portion of replicated servers, the router having a routing table configured to receive resource advertisements from the portion of replicated servers, the resource advertisements including at least capacity data of each replicated server, the router being operably linked to the domain server for resolving the designation of the resource location among the plurality of resource locations, wherein the domain server utilizes the anycast address protocol for accessing the plurality of resource locations, the router table being responsive to the anycast requests of the domain server to designate the resource location for access by the at least one client computer in accordance with the resource advertisements of the table, and wherein a resource advertisement is periodically transmitted from a corresponding replicated server upon a change of a predetermined amount in the capacity data of the corresponding replicated server.

2. The computer implemented system of claim 1, wherein the at least one router designates the resource location as the replicated server having the most available capacity in accordance with the resource advertisements of the table.

3. The computer implemented system of claim 1, wherein the resource advertisement includes link data.

4. The computer implemented system of claim 3, wherein the link data includes parameters for indicating a link latency value.

5. The computer implemented system of claim 1, wherein the routing table designates the resource location based only on a location of each replicated server.

6. The computer implemented system of claim 1, wherein the resource advertisement includes at least one of token bucket depth and token bucket rate.

7. The system of claim 1, wherein the replicated servers are arranged in a service hierarchy and respective Private Network Node Interface (PNNI) routing levels are used to identify respective hierarchical levels of the replicated servers.

8. The system of claim 7, wherein the at least one router designates the resource location as a replicated server on a lowest possible level in the service hierarchy, a difference in the respective PNNI routing levels of any two replicated servers in the service hierarchy being used as a measure of proximity between the two replicated servers.

9. A method of designating a replicated server among a plurality of replicated servers, comprising:

receiving, by a domain server, a service request from at least one client computer, the domain server operably linked to the plurality of replicated servers, wherein the replicated servers are accessible using an anycast address protocol;

receiving, by at least one router, an anycast service request from the domain server, each router operably linked to the domain server for resolving the designation of the replicated server among the plurality of replicated servers;

receiving, by a respective routing table of the at least one router, resource advertisements from the plurality of replicated servers, the resource advertisements including respective capacity data of the plurality of replicated servers; and designating the replicated server among the plurality of replicated servers based on information stored in the respective routing table, wherein a resource advertisement is periodically transmitted from each replicated server upon a change of a predetermined amount in the capacity data of the corresponding replicated server.

10. The method of claim 9, wherein the at least one router designates the replicated server having the most available capacity in accordance with the information in the respective routing table.

11. The method of claim 9, wherein the resource advertisements include link data.

12. The method of claim 9, wherein the link data includes parameters indicating a link latency value.

13. The method of claim 9, wherein the routing table designates the resource location based only on a location of each replicated server.

14. The method of claim 9, wherein the resource advertisement includes at least one of token bucket depth and token bucket rate.

15. The method of claim 9, wherein the replicated servers are arranged in a service hierarchy and respective Private Network Node Interface (PNNI) routing levels are used to identify respective hierarchical levels of the replicated servers.

16. The method of claim 15, wherein the at least one router designates the resource location as a replicated server on a lowest possible level in the service hierarchy, a difference in the respective PNNI routing levels of any two replicated servers in the service hierarchy being used as a measure of proximity between the two replicated servers.

*17. A system for managing resources, comprising:*

*a service supplier responsive to requests of a client computer, wherein the service supplier comprises:*

*a domain server capable of providing access to a plurality of resource locations based at least in part upon a request from the client computer, the plurality of resource locations comprising replicated servers capable of communicating with the domain server, a portion of the replicated servers being configured to be responsive to an anycast address protocol,*

*a router responsive to the portion of replicated servers, the router comprising a routing table capable of receiving resource advertisements from the portion of replicated servers, the resource advertisements comprising capacity data of each replicated server, the router being capable of communicating with the domain server for resolving designation of the resource location among the plurality of resource locations,*

*wherein the domain server is capable of utilizing the anycast address protocol for communicating with the plurality of resource locations, the router table being responsive to the anycast requests of the domain server to designate the resource location for access by the client computer based at least in part upon the resource advertisements of the table, and*

*wherein the resource advertisement is periodically transmitted from a corresponding replicated server upon a change of a predetermined amount in the capacity data of the corresponding replicated server.*

*18. The system according to claim 17, wherein the router is capable of designating the resource location as the replicated server having the most available capacity, based at least in part upon the resource advertisements of the table.*

*19. The system according to claim 17, wherein the resource advertisement comprises parameters for indicating a link latency value.*

*20. The system according to claim 17, wherein the routing table is capable of designating the resource location based only on a location of each replicated server.*

*21. The system according to claim 17, wherein the resource advertisement comprises a token bucket depth.*

*22. The system according to claim 17, wherein the resource advertisement comprises a token bucket rate.*

*23. An article comprising a non-transitory storage medium having stored thereon instructions, which, if executed, result in:*

*receiving a service request from at least one client computer, wherein a domain server is capable of communicating with the plurality of replicated servers, and wherein the replicated servers are capable of being accessed utilizing an anycast address protocol;*

*receiving resource advertisements from the plurality of replicated servers, the resource advertisements comprising respective capacity data of the plurality of replicated servers;*

*designating the replicated server among the plurality of replicated servers based at least in part on information stored in a respective routing table; and*

*periodically transmitting a resource advertisement from each replicated server based at least in part upon a change of a predetermined amount in the capacity data of the corresponding replicated server.*

*24. The article according to claim 23, further comprising receiving an anycast service request from the domain server, each router being capable of coupling to the domain server for resolving the designation of the replicated server among the plurality of replicated servers.*

*25. The article according to claim 23, further comprising, designating the replicated server having the most available capacity based at least in part upon the information in the respective routing table, at least in part by the at least one router.*

*26. The article according to claim 23, wherein the resource advertisements comprise link data.*

*27. The article according to claim 26, wherein the link data comprises parameters indicating a link latency value.*

*28. The article according to claim 23, further comprising designating the resource location based at least in part upon on a location of each replicated server, at least in part by the routing table.*

*29. The article according to claim 23, wherein the resource advertisement comprises a token bucket depth.*

*30. The article according to claim 23, wherein the resource advertisement comprises a token bucket rate.*

*31. The article according to claim 23, further comprising arranging the replicated servers in a service hierarchy.*

*32. A method, comprising:*

*receiving a service request from at least one client computer, wherein a domain server is capable of communicating with the plurality of replicated servers, and wherein the replicated servers are capable of being accessed utilizing an anycast address protocol;*

*receiving resource advertisements from the plurality of replicated servers, the resource advertisements comprising respective capacity data of the plurality of replicated servers;*

*designating the replicated server among the plurality of replicated servers based at least in part on information stored in a respective routing table of a router; and*

*periodically transmitting a resource advertisement from each replicated server based at least in part upon a change of a predetermined amount in the capacity data of the corresponding replicated server.*

*33. The method according to claim 32, further comprising receiving an anycast service request from the domain server, each router being capable of coupling to the domain server for resolving the designation of the replicated server among the plurality of replicated servers.*

*34. The method according to claim 32, further comprising, designating the replicated server having the most available capacity based at least in part upon the information in the respective routing table, at least in part by the at least one router.*

*35. The method according to claim 32, wherein the resource advertisements comprise link data.*

*36. The method according to claim 35, wherein the link data comprises parameters indicating a link latency value.*

*37. The method according to claim 32, further comprising designating the resource location based at least in, part upon on a location of each replicated server, at least in part by the routing table.*

*38. The method according to claim 32, wherein the resource advertisement comprises a token bucket depth.*

*39. The method according to claim 32, wherein the resource advertisement comprises a token bucket rate.*

*40. The method according to claim 32, further comprising arranging the replicated servers in a service hierarchy.*

* * * * *